Dec. 10, 1935.  C. W. FURNAS  2,023,521
PAN HANDLING DEVICE
Filed March 1, 1934
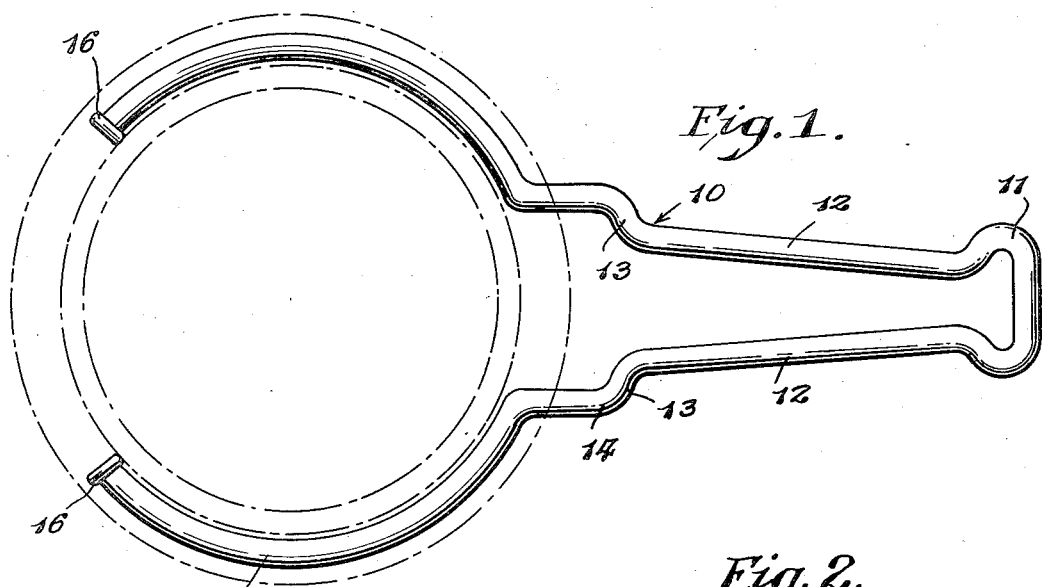
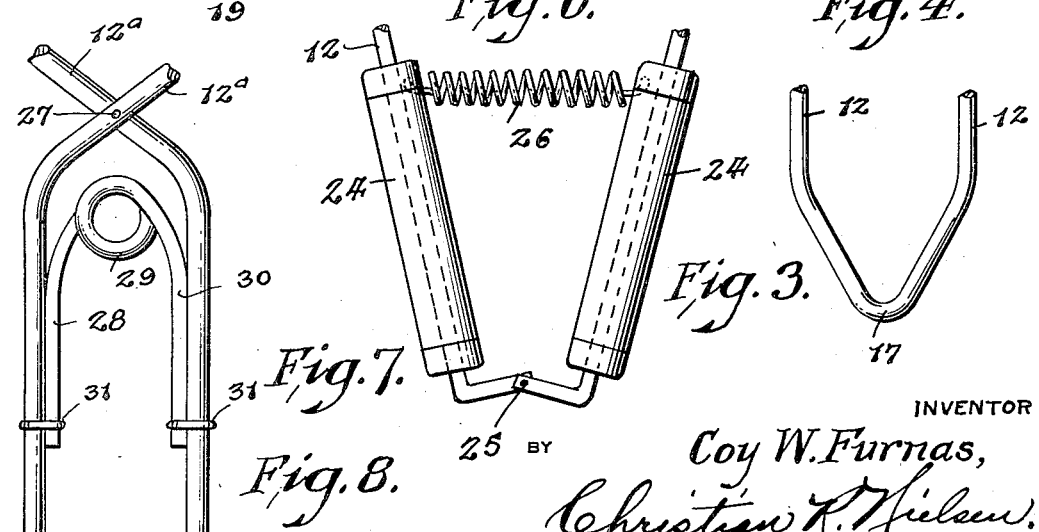

Patented Dec. 10, 1935

2,023,521

UNITED STATES PATENT OFFICE 2,023,521

PAN HANDLING DEVICE

Coy W. Furnas, Wilmington, Calif.

Application March 1, 1934, Serial No. 713,567

3 Claims. (Cl. 294—33)

My invention relates to devices for lifting and moving pie-plates, baking and cooking pans and vessels generally, from ovens or stoves or elsewhere, and it consists in the constructions, arrangements and combinations herein described and claimed.

It is an object of my invention to provide a pan lifter which may be formed from a single strand of suitable gauge of spring wire, permitting grasping of pans of varying diameters by merely compressing the handles of the pan lifter.

It is a still further object of the invention to provide a pan handling device which will afford full support for a pan being grasped as well as providing means tending to tilt the pan being lifted, toward the person using the device, thus avoiding danger of the pan sliding off of the pan handle.

Additional objects, advantages and features of invention will be apparent from the following description and accompanying drawing, wherein Figure 1 is a top plan view of my device in operative position upon a pan.

Figure 2 is a side elevation thereof, and

Figures 3 to 8 illustrate modified forms of the handle construction.

Referring particularly to Figures 1 and 2 of the drawing, there is illustrated a pan handler generally indicated by the reference character 10, formed from a single strand of steel wire bent intermediate its length to define a more or less angular bight portion 11, from which handle portions 12 extend, diverging slightly from each other. The handle portions may be of any suitable length and are bent at right angles away from each other as at 13. The right angular bent members 13 extend a suitable distance from the handles 12, whence they are given an angular bend as at 14, finally terminating in opposed curved arms 15.

It will be understood that the arms 15 are normally spaced apart sufficiently to readily accommodate a pie plate, pan or the like in edgewise fashion, respective arms 15 being positioned beneath the rim of the utensil upon opposite sides and by a slight compressing action exerted upon the handles 12, the pan will be firmly gripped, permitting ready lifting and carrying of the pan.

Attention is now invited to Figure 2 of the drawing, where it is clearly shown that the extremities of the arms 15 terminate in knobs 16. The knobs 16 are of a size substantially larger than the diameter of the curved arms 15, and when in use, the knobs 16 function to elevate the pan being gripped, at points opposite the handles, thereby avoiding the possibility of the pan sliding forwardly from positive retention by the arms 15.

It will, of course, be understood that the bight portion 11 provides sufficient resilience to cause the arms 15 to assume their normal open positions.

In Figure 3 I have illustrated the bight portion 17 of an acutely bent formation, while in Figure 4, the bight portion 18 is less abruptly bent.

In Figure 5 the bight portion 19 is defined by a loop 20, the handles 12 of which are crossed as at 21.

Figure 6 illustrates a modification of the structure shown in Figure 5, the bight 22 being bent to define eyelets 23 intermediate the handles 12 and the bight.

A further form of handle is illustrated in Figure 7, wherein the handles 12 are provided with suitable hand grips 24, the extremities of the handles being bent at right angles toward each other and hingedly connected as at 25.

In order to maintain the handles 12 in normal spaced apart relation, a helical spring 26 is positioned and secured between the outer extremities of the hand grips 24.

Figure 8 illustrates the pan gripping device as composed of crossed handles 12a pivoted as at 27. In this form the bight portion is eliminated, and use in made of a spring 28 for maintaining the handles in normal positions. The spring 28 comprises a helix 29 from which extension portions 30 extend parallel with the inside portions of the handles 12a. The extensions 30 may be secured to the handles 12 in any approved manner, rings 31 being shown in the present instance.

In the forms of pan gripping devices illustrated in Figs. 7 and 8, the arms 12 and 12a, in each instance, include the opposed curved arms 15 and knobs 16, as clearly illustrated in Figs. 1 and 2.

I claim:—

1. A pan handling device comprising a handle, spring arms extended axially therefrom and terminating at a point substantially opposite the handle, each of the arms having annular enlargements at their extremities for engaging the underside of a rim of a pan engaged by the arms, whereby to tilt the pan toward the handle.

2. A pan handling device formed from a single strand of wire bent intermediate its length to define a spring bight portion, diverging arms extending from the bight portion, said arms being bent to define curved portions adapted to engage beneath the rim of a pan embraced thereby and terminating at points substantially opposite the bight portion, and each of said curved portions having annular knobs at their extremities of a size greater than the diameter of the wire defining the curved portions, whereby to tilt the pan toward the bight portion.

3. A pan handling device comprising a handle, pan embracing arms associated therewith and terminating at points substantially opposite the handle, and each of said arms having annular knobs at their extremities of a size greater than the diameter of the arms whereby to tilt an engaged pan toward the handle.

COY W. FURNAS.